United States Patent
Serbus

(10) Patent No.: US 11,237,826 B2
(45) Date of Patent: Feb. 1, 2022

(54) APPLICATION OWNERSHIP ENFORCEMENT

(71) Applicant: Microsoft Technology Licensing, LLC, Redmond, WA (US)

(72) Inventor: Brent Joseph Serbus, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

(21) Appl. No.: 16/564,475

(22) Filed: Sep. 9, 2019

(65) Prior Publication Data
US 2021/0072982 A1 Mar. 11, 2021

(51) Int. Cl.
G06F 9/44 (2018.01)
G06F 9/445 (2018.01)
G06F 8/77 (2018.01)
G06F 16/23 (2019.01)
G06F 16/25 (2019.01)
G06F 8/41 (2018.01)

(52) U.S. Cl.
CPC ............... *G06F 8/77* (2013.01); *G06F 8/41* (2013.01); *G06F 16/2365* (2019.01); *G06F 16/252* (2019.01)

(58) Field of Classification Search
CPC .......... G06F 8/77; G06F 8/41; G06F 16/2365; G06F 16/252
See application file for complete search history.

(56) References Cited

U.S. PATENT DOCUMENTS 8,336,028 B2 12/2012 Hinton et al.
8,341,600 B2 12/2012 Sutherland et al.
8,418,130 B2 4/2013 Tittizer et al.
(Continued)

FOREIGN PATENT DOCUMENTS

EP 1018833 A2 7/2000

OTHER PUBLICATIONS

Stephen Chong, SIF: Enforcing Confidentiality and Integrity in Web Applications, 2007, pp. 1-16. https://www.cs.cornell.edu/andru/papers/sif.pdf (Year: 2007).*

(Continued)

*Primary Examiner* — Mongbao Nguyen
(74) *Attorney, Agent, or Firm* — Rainier Patents, P.S.

(57) ABSTRACT

Described herein is an application ownership enforcement system and method. Ownership identification information (e.g., name, email address, identifier) regarding portion(s) (e.g., a function, a subroutine, a module, an HTML page, a component, a form, and/or an element) of an application is received and stored in the application. In response to receipt of a request to compile the application, prior to compilation, the stored ownership identification information can be compared to stored information regarding current users (e.g., a list, a directory, a database). When it is determined that the stored ownership information is currently valid, the application can be permitted to be compiled. When it is determined that the stored ownership information is not currently valid, the application is not permitted to be compiled or a warning provided, and, information regarding the determination that the stored ownership information is not currently valid can be provided (e.g., via a graphical user interface).

20 Claims, 7 Drawing Sheets

(56) References Cited

U.S. PATENT DOCUMENTS

| | | | |
|---|---|---|---|
| 8,589,880 | B2 | 11/2013 | Jones et al. |
| 9,311,076 | B2 | 4/2016 | Grillo et al. |
| 9,612,826 | B2 | 4/2017 | Leupold et al. |
| 9,785,432 | B1 | 10/2017 | Wright |
| 10,248,919 | B2* | 4/2019 | Shuster ............ G06Q 10/06311 |
| 10,681,168 | B2* | 6/2020 | Berger .................. G06Q 30/02 |
| 2013/0067601 | A1* | 3/2013 | Dwivedi ............... G06F 21/121 726/30 |
| 2013/0326344 | A1 | 12/2013 | Masselle et al. |
| 2014/0281872 | A1 | 9/2014 | Glover |
| 2015/0134552 | A1* | 5/2015 | Engels ................. H04L 9/3297 705/318 |
| 2015/0199185 | A1 | 7/2015 | Saff et al. |
| 2016/0057025 | A1* | 2/2016 | Hinrichs ............ H04L 41/5025 709/224 |
| 2016/0179505 | A1* | 6/2016 | Grillo ....................... G06F 8/71 717/101 |
| 2016/0232334 | A1* | 8/2016 | Kosovan .............. G06F 21/105 |
| 2017/0134381 | A1* | 5/2017 | Abdelhamed ........... H04L 63/10 |
| 2017/0208137 | A1* | 7/2017 | Kirkpatrick ............ H04L 67/34 |
| 2017/0322934 | A1* | 11/2017 | Chen ........................ G06F 8/71 |
| 2018/0081784 | A1* | 3/2018 | Rivera ...................... G06F 8/43 |
| 2018/0276584 | A1* | 9/2018 | Woulfe ............ G06Q 10/06398 |
| 2018/0285242 | A1* | 10/2018 | Aasheim ............. G06F 11/0793 |
| 2018/0322437 | A1* | 11/2018 | McClory .................. G06F 8/41 |
| 2019/0087310 | A1* | 3/2019 | Lin ....................... H04W 12/77 |
| 2019/0250894 | A1* | 8/2019 | Dobry ....................... G06F 8/41 |
| 2019/0377571 | A1* | 12/2019 | Gupta .............. G06F 16/90335 |
| 2020/0104236 | A1* | 4/2020 | Creel .................. G06F 16/2365 |

OTHER PUBLICATIONS

Martin E. Nordberg III, Managing Code Ownership, 2003, pp. 1-8 https://ieeexplore.ieee.org/stamp/stamp.jsp?tp=&arnumber=1184163 (Year: 2003).*

"Verify Your Site Ownership", Retrieved from https://support.google.com/webmasters/answer/9008080?hl=en&visit_id=636899576271992008-3521855188&rd=1, Apr. 4, 2019, 4 Pages.

"What's New in CodeLens?", Retrieved from https://www.youtube.com/watch?v=23HtpelUVDw, Nov. 18, 2015, 2 Pages.

Bacchelli, et al., "Expectations, Outcomes, and Challenges of Modern Code Review", In Proceedings of the 35th International Conference on Software Engineering, May 18, 2013, pp. 712-721.

"International Search Report and Written Opinion Issued in PCT Application No. PCT/US20/038011", dated Sep. 23, 2020, 11 Pages.

* cited by examiner

APPLICATION OWNERSHIP ENFORCEMENT

BACKGROUND

Applications can frequently be developed over a period of time (e.g., days, months, years) by a team of developers, for example, with each member of the team responsible for portion(s) of a particular application. Members of the team can also change, with member(s) changing positions within an organization and/or leaving the organization. Thus, there can be an ongoing struggle within an organization that makes it difficult to know which developer is responsible for a particular portion of an application at a particular point in time.

SUMMARY

Described herein is an application ownership enforcement system, comprising: a computer comprising a processor and a memory having computer-executable instructions stored thereupon which, when executed by the processor, cause the computer to: receive a request to compile an application, at least a portion of the application comprising ownership identification information; in response to the request, before compiling the application, determine whether the ownership identification of the at least the portion of the application is currently valid based, at least in part, upon stored information regarding current users; when it is determined that the ownership identification information is currently valid, compile the application; when it is determined that the ownership identification information is not currently valid: not allowing the application to be compiled; and provide information via a graphical user interface regarding the determination that the ownership identification information is not currently valid.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
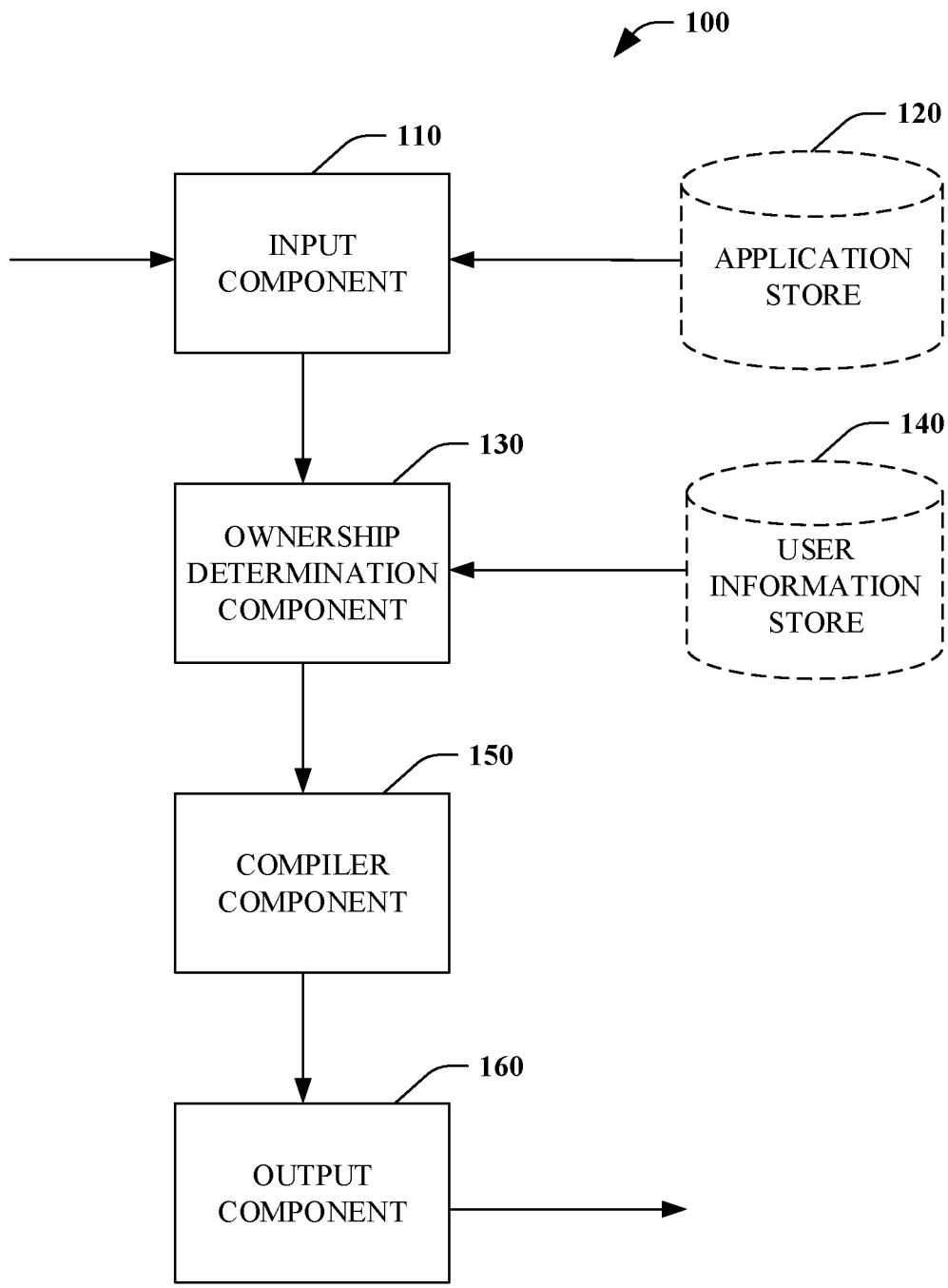
FIG. 1 is a functional block diagram that illustrates an application ownership enforcement system.

Various technologies pertaining to application ownership enforcement are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding application ownership enforcement. What follows are one or more exemplary systems and methods.

Aspects of the subject disclosure pertain to the technical problem of application ownership enforcement. The technical features associated with addressing this problem involve receiving a request to compile a application, at least a portion of the application comprising ownership identification information; in response to the request, before compiling the application, determining whether the ownership identification information of the at least the portion of the application is currently valid based, at least in part, upon stored information regarding current users; when it is determined that the ownership identification information is currently valid, compiling the application; when it is determined that the ownership identification information is not currently valid: not allowing the application to be compiled; and providing information via a graphical user interface regarding the determination that the ownership identification information is not currently valid. Accordingly, aspects of these technical features exhibit technical effects of more efficiently and effectively generating applications, for example, reducing computer resource consumption and/or development time.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

As discussed above, applications can frequently be developed over a period of time (e.g., days, months, years) by a team of developers, for example, with each member of the team responsible for portion(s) of a particular application. Members of the team can also change, with member(s) changing positions within an organization and/or leaving the organization. Thus, there can be an ongoing struggle within an organization that makes it difficult to know which developer is responsible for a particular portion of an application at a particular point in time. For example, a user of the application may have a question, suggestion, and/or information regarding a bug of a portion of the application.

Described herein is an application ownership enforcement system and method. During development of an application (e.g., creation of a new application and/or maintenance of an existing application), ownership identification information (e.g., developer name, developer email address, developer identifier) regarding portion(s) (e.g., a function, a subroutine, a module, an HTML page, a component, a form, and/or an element) of the application is received and stored in the application.

In response to receipt of a request to compile the application, prior to compiling the application, the stored ownership identification information within the application can be compared to stored information regarding current users (e.g., a list, a directory, a database). When it is determined that the stored ownership information is currently valid, the application can be permitted to be compiled. In some embodiments, when it is determined that the stored ownership information is not currently valid, the application is not permitted to be compiled, and, information regarding the determination that the stored ownership information is not currently valid can be provided (e.g., via a graphical user interface). In some embodiments, when it is determined that the stored ownership information is not currently valid, the application is allowed to compile; however, a warning is provided which can include providing information regarding the determination that the stored ownership information is not currently valid. Once the application has been compiled, during deployment of the application, the stored ownership information can be selectively provided (e.g., displayed) to a user of the application.

For purposes of explanation and not limitation, the system and method are described herein with respect to a web application. A web application is an application that is accessible over a network (e.g., the Internet or an intranet). A web application may be hosted in a browser-controlled environment or coded in a browser-supported language with the application relying on a web browser to execute. However, in some embodiments, the system and method can be utilized with any suitable source code file having ownership identification information which is resolved against stored user information before allowing compilation of the source code.

Referring to FIG. 1, an application ownership enforcement system 100 is illustrated. In some embodiments, the system 100 performs ownership enforcement before permitting compilation of the application to be performed. In this manner, before allowing compilation of the application, the system 100 confirms that the application includes currently valid ownership information.

The system 100 includes an input component 110 that receives a request to compile a particular application. In some embodiments, the input component 110 can further receive the particular application along with the request to compile the particular application. In some embodiments, in response to the request, the input component 110 can retrieve the particular application, for example, from an application store 120 that stores source code (e.g., hypertext markup language (HTML)) for one or more applications.

The particular application includes ownership identification information associated with portion(s) (e.g., an HTML page, a component, a form, and/or an element) of the particular application stored in the application. The ownership information comprises information identifying an individual, a role, a group of individuals, and/or a subgroup of an organization responsible for inquiry(ies) regarding and/or maintenance of a particular portion of the application.

In some embodiments, the ownership identification information can include, for example, a name, an email address, a unique identifier, and/or an organization identifier associated with the portion(s) of the particular application. In some embodiments, the ownership identification information can be associated with the portion(s) of the particular application when the application is created, modified, and/or maintained.

In some embodiments, ownership identification information associated with portion(s) (e.g., an HTML page, a component, a form, and/or an element) can be hierarchical. In some embodiments, hierarchical ownership identification information can be inherited (e.g., with an ability to be overridden). For example, an HTML page can include ownership identification information of a first individual (e.g., project manager), while an individual element can include ownership identification information of a second individual (e.g., developer).

The system 100 further includes an ownership determination component 130 that in response to the request to compile the particular application, before compiling the application, determines whether the ownership identification information of the portion(s) of the application is currently valid based, at least in part, upon stored information regarding current users. In some embodiments, the stored information regarding current users is stored in a stored user information store 140. The stored information regarding current users can comprise a list of current users, a directory of current users (e.g., Azure® Active Directory), a database of current users, etc. In some embodiments, the information regarding current users can be stored hierarchically (e.g., based upon a hierarchy of an organization).

In some embodiments, the ownership determination component 130 can utilize one or more rules and/or policy(ies) in determining whether the ownership identification information of the portion(s) of the application is currently valid. In some embodiments, a policy can define a particular group (e.g., team) of individuals (e.g., developers) that are responsible for inquiry(ies) regarding and/or responsible for maintaining the particular application. In some embodiments, a policy can define a particular subgroup (e.g., department) of an organization (e.g., "Team1"), member(s) of which are responsible for inquiry(ies) regarding and/or responsible for maintaining the particular application. In some embodiments, a policy can define particular individual(s) (e.g., manager(s)) responsible for inquiry(ies) regarding and/or maintaining the particular application. Only the particular individual(s), group(s) and/or individual(s) that report directly and/or indirectly to the particular individual(s) are responsible for inquiry(ies) regarding and/or maintaining the particular application.

When the ownership determination component 130 determines that the stored ownership information is currently valid, the particular application can be permitted to be compiled by a compiler component 150. Once the particular application has been compiled, during deployment of the particular application, the stored ownership information can be selectively provided (e.g., displayed) to a user of the application in response to interaction with an application interface. In some embodiments, when a user hovers over a particular section of an HTML page, the user can receive at least some of the stored ownership information (e.g., information regarding who to contact specifically for question(s), ownership issue(s)). In some embodiments, when a user interacts with a control of a graphical user interface of a desktop application or mobile phone application (e.g., "contact information" control), the user can receive at least some of the stored ownership information. In some embodiments, when a provides a specific keyboard input, combination of specific keyboard inputs, and/or sequence of keyboard inputs, the user can receive at least some of the stored ownership information.

In some embodiments, the stored ownership information is conditionally provided to particular user(s) (e.g., based upon user credential(s), role(s)). In some embodiments, the stored ownership information is conditionally provided to user(s) having particular Internet Protocol address(es) (e.g., IP addresses).

When the ownership determination component 130 determines that the stored ownership information is not currently valid, the particular application is not permitted to be compiled. Information regarding the determination that the stored ownership information is not currently valid can be provided by an output component 160 (e.g., via a graphical user interface).

Figure 2:
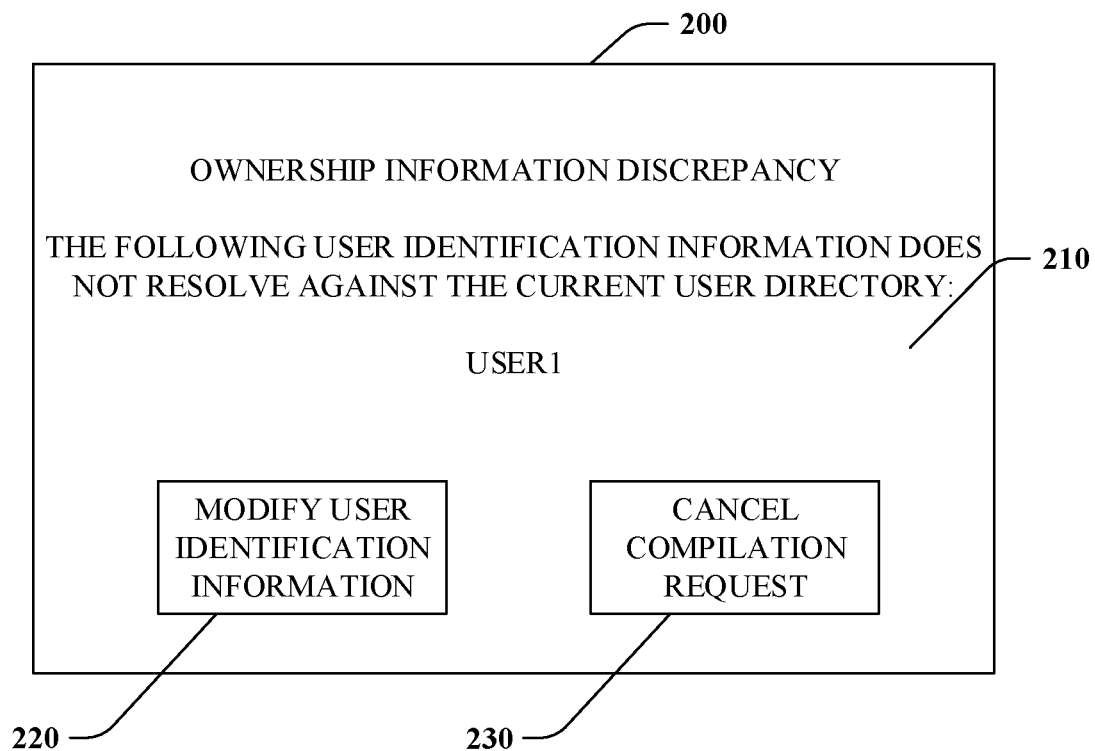
FIG. 2 is a diagram of an exemplary user interface.

In some embodiments, the ownership determination component 130 can provide a graphical user interface to allow modification of the stored ownership information determined to be not currently valid. Referring briefly to FIG. 2, a diagram of an exemplary user interface 200 is illustrated. The user interface 200 includes a field 210 comprising information regarding the determination that the stored ownership information is not currently valid. The user interface 200 further includes a control 220 that allows a user to modify user identification information associated with portion(s) of the particular application (e.g., coupled to a source code editor and/or development environment (not shown)). The user interface 200 also includes a control 230 that allows for cancelation of the compilation request. For example, the user can cancel the compilation request, edit user identification information, and subsequently request compilation of the particular application.

Referring back to FIG. 1, in some embodiments, the ownership determination component 130 repeatedly determines whether the ownership identification information of the portion(s) of the application is currently valid, provides information regarding the stored ownership information not currently valid, allows modification of the stored ownership information, until all ownership identification information of the portion(s) of the particular application is determined to be currently valid.

In this manner, the particular application is not allowed to be built (e.g., compiled) unless all ownership identification information has been resolved against current stored user information. For example, consider a scenario in which a user (e.g., developer) leaves an organization (as reflected in the user information store 140). If the user still owns portion(s) of an application (e.g., ownership identification information is associated with the user), the system 100 does not allow the application to be compiled until the ownership identification information has been reassigned to a current user (as reflected in the user information store 140).

In some embodiments, the system 100 can be a component of a development environment. In some embodiments, the system 100 can be a feature accessible via an application development environment.

FIGS. 3-6 illustrate exemplary methodologies relating application ownership enforcement. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 3:
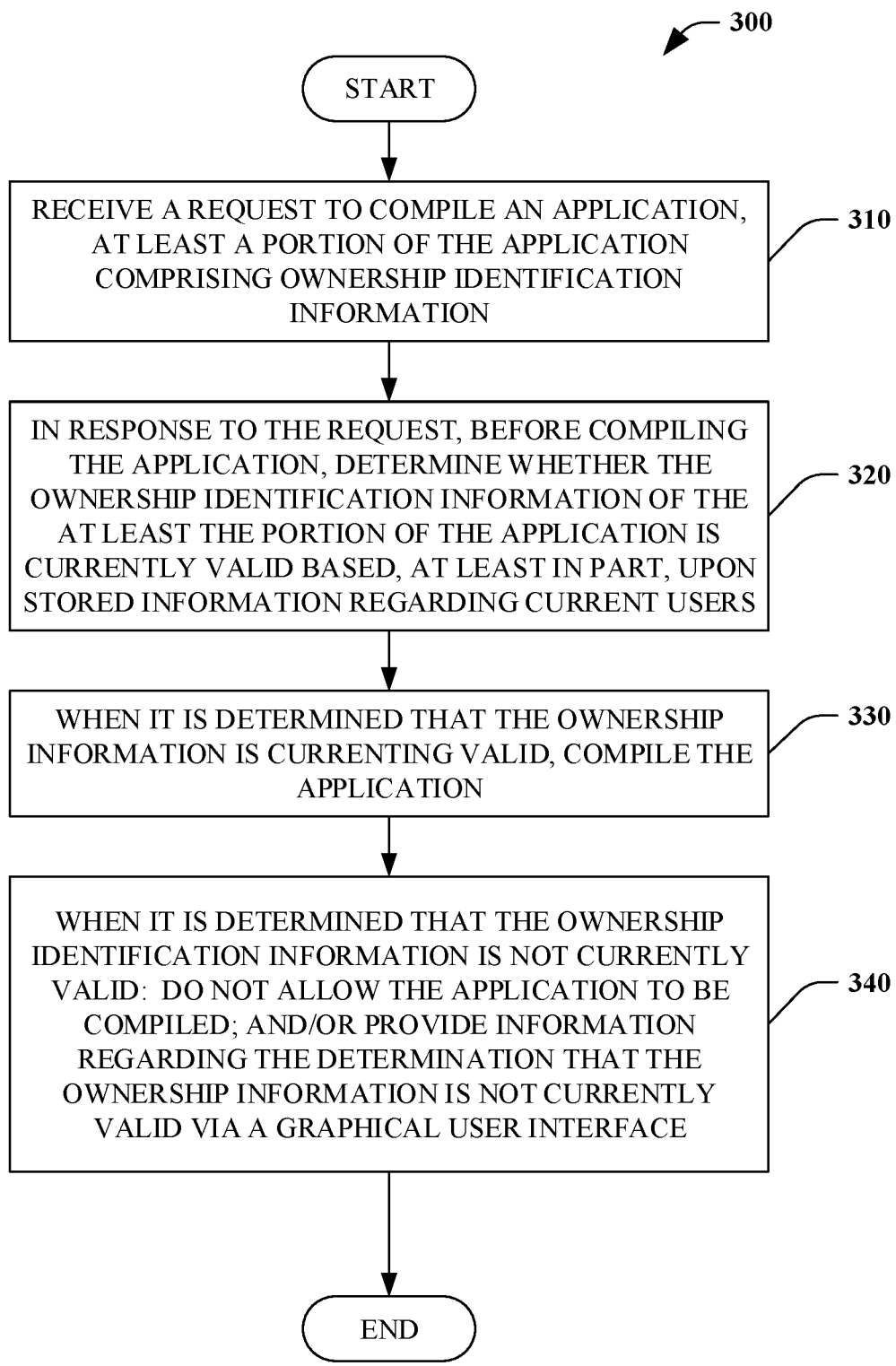
FIG. 3 is a flow chart of an exemplary method of enforcing application ownership.

Referring to FIG. 3, a method of enforcing application ownership 300 is illustrated. In some embodiments, the method 300 is performed by the system 100.

At 310, a request to compile an application is received. At least a portion of the application comprises ownership identification information. At 320, in response to the request, before compiling the application, a determination is made as to whether the ownership identification information of the at least the portion of the application is currently valid based, at least in part, upon stored information regarding current users. At 330, when it is determined that the ownership identification information is currently valid, the application is compiled (e.g., allowed to be compiled), and, no further processing occurs.

At 340, when it is determined that the ownership identification information is not currently valid: in some embodiments, the application is not allowed to be compiled, and/or, information regarding the determination that the ownership identification information is not currently valid is provided via a graphical user interface. In some embodiments, when it is determined that the ownership information is not currently valid, the application is allowed to compile; however, a warning is provided via the graphical user interface along with information regarding the determination that the ownership identification information is not currently valid.

Figure 4:
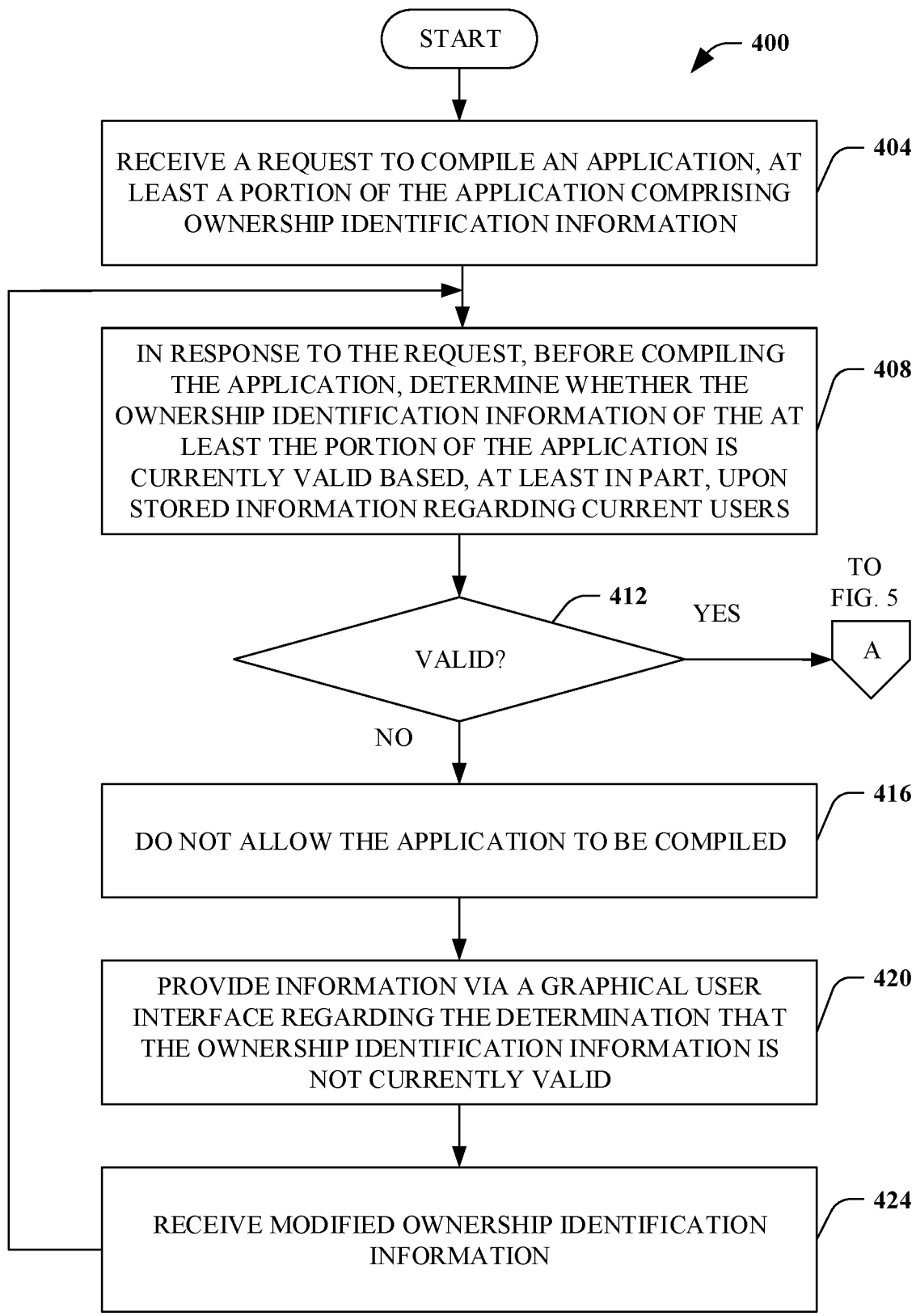
FIGS. 4 and 5 are flow charts of an exemplary method of enforcing application ownership.
Figure 5:
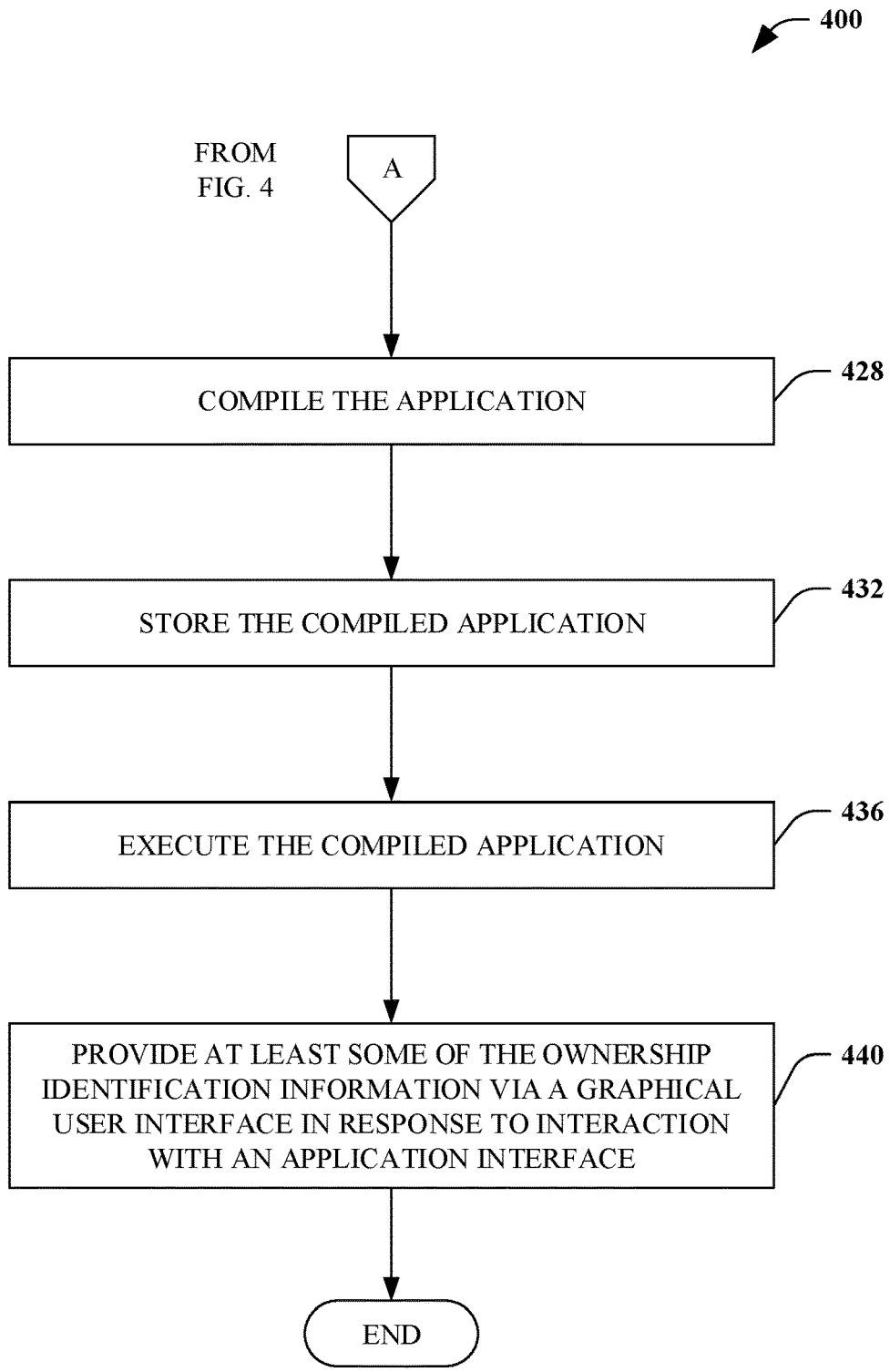

Turning to FIGS. 4 and 5, a method of enforcing application ownership 400 is illustrated. In some embodiments, the method 400 is performed by the system 100.

At 404, a request to compile an application is received. At least a portion of the application comprises ownership identification information. At 408, in response to the request, before compiling the application, a determination is made as to whether the ownership identification information of the at least the portion of the application is currently valid based, at least in part, upon stored information regarding current users.

At 412, if it is determined that the ownership identification information is not currently valid, at 416, the application is not allowed to be compiled. At 420, information regarding the determination that the ownership identification information is not currently valid is provided via a graphical user interface. At 424, modified ownership identification information is received, and, processing continues at 408.

At 412, if it is determined that the ownership identification information is currently valid, at 428, the application is compiled. At 432, the compiled application is stored. At 436, the compiled application is executed. At 440, at least some of the ownership identification information is provided via a graphical user interface in response to interaction with an application interface. In some embodiments, the ownership identification information is provided in response to a user hovering over a portion of the executing application. In some embodiments, the ownership identification information is provided in response to user interaction with a control of a graphical user interface of a desktop application or mobile phone application. In some embodiments, the ownership identification information is provided in response to a specific keyboard input, combination of specific keyboard inputs, and/or sequence of keyboard inputs.

Thus, the compile ownership identification information is accessible post-compile, for example, to provide assistance of the user. In some embodiments, a developer/owner of the application specifies the ownership identification information that is presented via the graphical user interface and/or how the ownership identification information is presented via the graphical user interface.

Figure 6:
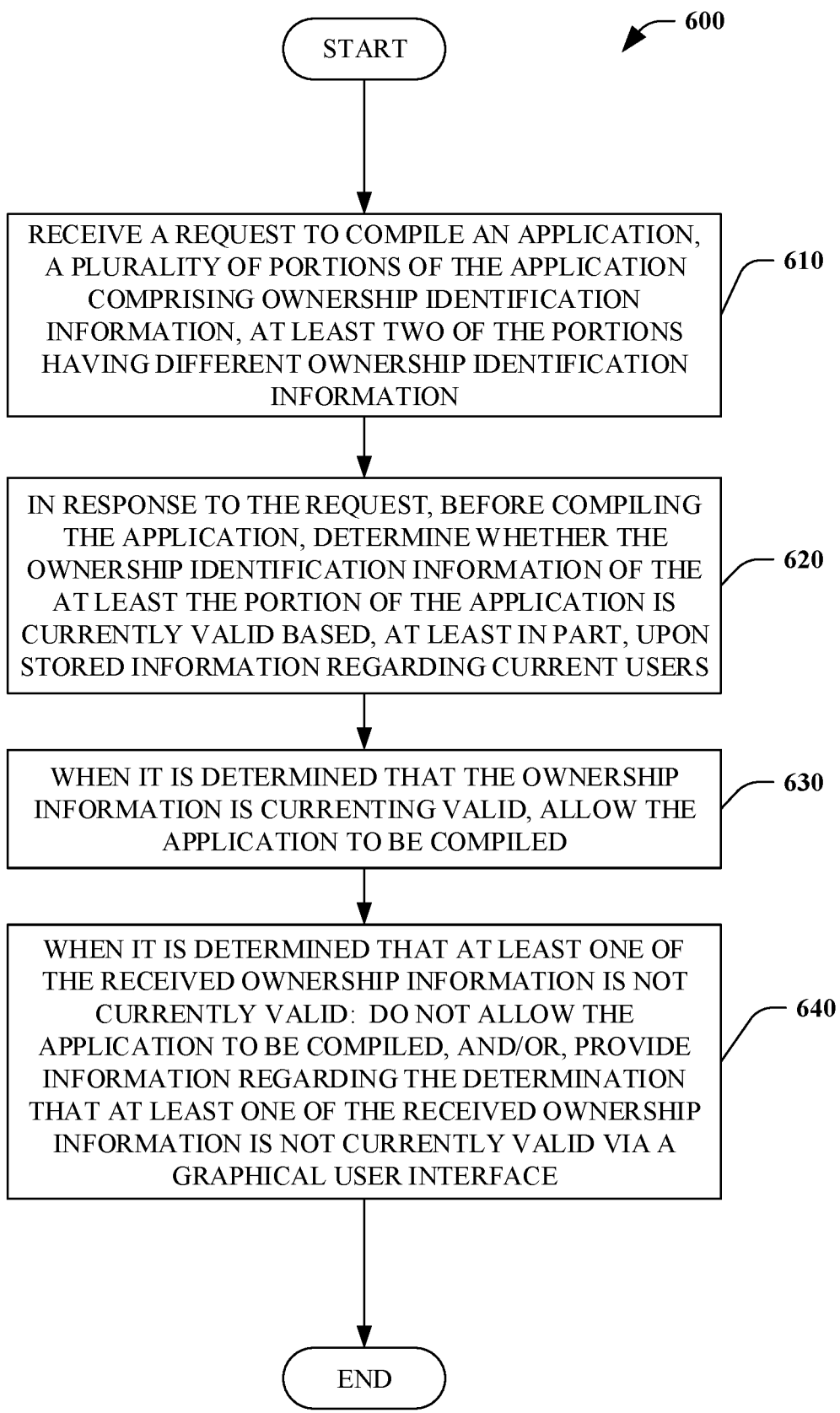
FIG. 6 is a flow chart of an exemplary method of enforcing application ownership.

Referring to FIG. 6, a method of enforcing application ownership 600 is illustrated. In some embodiments, the method 600 is performed by the system 100.

At 610, a request to compile an application is received. A plurality of portions of the application comprising ownership identification information, at least two of the portions having different ownership identification information.

At 620, in response to the request, before compiling the application, a determination is made as to whether the received ownership identification information is currently valid based upon stored information regarding current users.

At 630, when it is determined that the received ownership information is currently valid, the application is allowed to be compiled. At 640, when it is determined that at least one of the received ownership information is not currently valid: the application is not allowed to be compiled and/or information regarding the determination that at least one of the received ownership information is not currently valid is provided via a graphical user information.

Described herein is an application ownership enforcement system, comprising: a computer comprising a processor and a memory having computer-executable instructions stored thereupon which, when executed by the processor, cause the computer to: receive a request to compile an application, at least a portion of the application comprising ownership identification information; in response to the request, before compiling the application, determine whether the ownership identification information of the at least the portion of the application is currently valid based, at least in part, upon stored information regarding current users; when it is determined that the ownership identification information is currently valid, compile the application; when it is determined that the ownership identification information is not currently valid: not allowing the application to be compiled; and provide information via a graphical user interface regarding the determination that the ownership identification information is not currently valid.

The system can include the memory having further computer-executable instructions stored thereupon which, when executed by the processor, cause the computer to: receive ownership identification information for at least a portion of the application. The system can further include wherein the stored information regarding current users comprises a hierarchical directory of active users. The system can include the memory having further computer-executable instructions stored thereupon which, when executed by the processor, cause the computer to: when it is determined that the ownership identification information is not currently valid: receive modified ownership identification information, wherein the determination whether the ownership identification information of the at least the portion of the application is currently valid is performed repeatedly until all ownership identification information of the application is determined to be currently valid.

The system can further include wherein determine whether the ownership identification information of the at least the portion of the application is currently valid based, at least in part, a policy that defines a particular group of individuals that are responsible for the particular application. The system can further include wherein determine whether the ownership identification information of the at least the portion of the application is currently valid based, at least in part, a policy that defines a particular individual that is responsible for the particular application. The system can further include wherein the policy further permits individuals that report to the particular individual to be responsible for the particular application.

Described herein is a method of enforcing application ownership, comprising: receiving a request to compile an application, at least a portion of the application comprising ownership identification information; in response to the request, before compiling the application, determining whether the ownership identification information of the at least the portion of the application is currently valid based, at least in part, upon stored information regarding current users; when it is determined that the ownership identification information is currently valid, compiling the application; when it is determined that the ownership identification information is not currently valid: not allowing the application to be compiled; and providing information via a graphical user interface regarding the determination that the ownership identification information is not currently valid.

The method can further include receiving ownership identification information for at least a portion of the application. The method can further include wherein the stored information regarding current users comprises a hierarchical directory of active users. The method can further include when it is determined that the ownership identification information is not currently valid: receiving modified ownership identification information, wherein determining whether the ownership identification information of the at least the portion of the application is currently valid is performed repeatedly until all ownership identification information of the application is determined to be currently valid.

The method can further include wherein determining whether the ownership identification information of the at least the portion of the application is currently valid based, at least in part, a policy that defines a particular group of individuals that are responsible for the particular application. The method can further include wherein determining whether the ownership identification information of the at least the portion of the application is currently valid based, at least in part, a policy that defines a particular individual that is responsible for the particular application. The method can further include wherein the policy further permits individuals that report to the particular individual to be responsible for the particular application.

Described herein is a computer storage media storing computer-readable instructions that when executed cause a computing device to: receive a request to compile an application, at least a portion of the application comprising ownership identification information; in response to the request, before compiling the application, determine whether the ownership identification information of the at least the portion of the application is currently valid based, at least in part, upon stored information regarding current users; when it is determined that the ownership identification information is currently valid, compile the application; when it is determined that the ownership identification information is not currently valid: not allowing the application to be compiled; and provide information via a graphical user interface regarding the determination that the ownership identification information is not currently valid.

The computer storage media can store further computer-readable instructions that when executed cause a computing device to: receive ownership identification information for at least a portion of the application. The computer storage media can further include wherein the stored information regarding current users comprises a hierarchical directory of active users.

The computer storage media can store further computer-readable instructions that when executed cause a computing device to: when it is determined that the ownership identification information is not currently valid: receive modified ownership identification information, wherein the determination whether the ownership identification information of the at least the portion of the application is currently valid is performed repeatedly until all ownership identification information of the application is determined to be currently valid. The computer storage media can further include wherein determine whether the ownership identification information of the at least the portion of the application is currently valid based, at least in part, a policy that defines a particular group of individuals that are responsible for the particular application.

Figure 7:
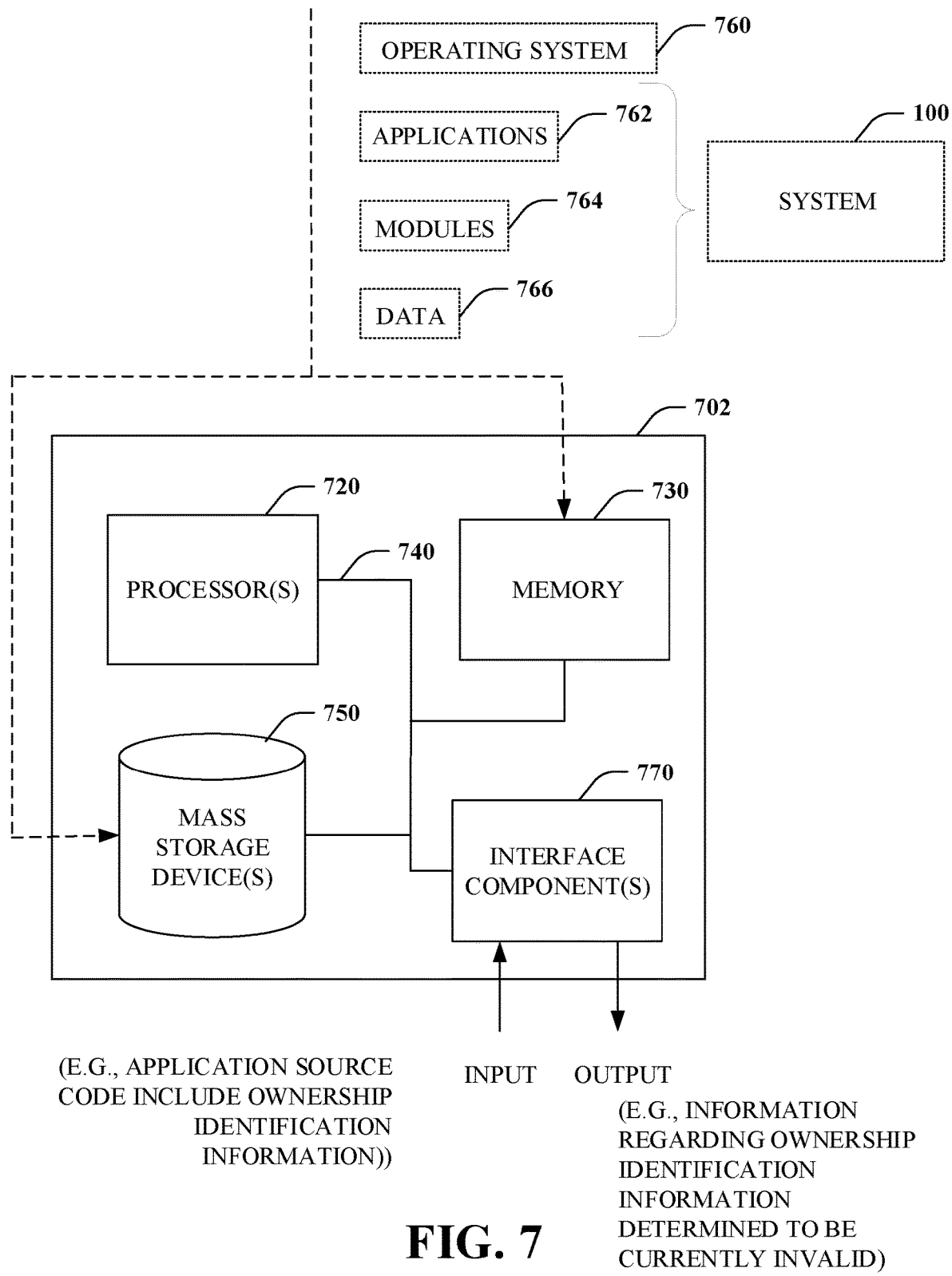
FIG. 7 is a functional block diagram that illustrates an exemplary computing system.

With reference to FIG. 7, illustrated is an example general-purpose computer or computing device 702 (e.g., mobile phone, desktop, laptop, tablet, watch, server, handheld, programmable consumer or industrial electronics, set-top box, game system, compute node, etc.). For instance, the computing device 702 may be used in an application ownership enforcement system 100.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device(s) 750 whose functionality can be realized when executed by one or more processor(s) 720.

In some embodiments, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g. serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
   receiving a request to build an application, a portion of the application being associated with responsible developer ownership identification information identifying a responsible developer who is responsible for maintaining the portion of the application;
   before building the application in response to the request, determining whether the responsible developer is identified as a current user in stored information regarding current users;
   determining whether to build the application based at least on whether the responsible developer is identified as a current user;
   in a first instance when the responsible developer is identified as a current user, building the application;
   in a second instance when the responsible developer is not identified as a current user:
   preventing the application from being built; and
   providing information via a graphical user interface indicating that the responsible developer is not a current user.

2. The method of claim 1, wherein the stored information identifies the responsible developer as a current user when the responsible developer is a current member of an organization associated with the application.

3. The method of claim 2, wherein the stored information regarding current users comprises a hierarchical directory of current members of the organization.

4. The method of claim 3, further comprising:
   in the second instance when it is determined that the responsible developer is not identified as a current user, receiving modified responsible developer ownership identification information identifying a different responsible developer and subsequently allowing the application to be built provided the different responsible developer is identified in the hierarchical directory as a current member of the organization.

5. The method of claim 1, further comprising:
   determining whether to build the application based, at least in part, on a policy that defines a particular group of individuals that are responsible for the application.

6. The method of claim 1, wherein the request to build the application is a compilation request and the application is compiled in the first instance.

7. The method of claim 6, further comprising:
   detect a hover over the portion of the application; and
   in response to the hover over the portion of the application, output ownership identification information identifying the responsible developer via a user interface.

8. A system, comprising:
   a processor; and
   a memory having computer-executable instructions stored thereupon which, when executed by the processor, cause the system to:
   receive a build request to build an application, a portion of the application being associated with ownership identification information identifying a responsible user that is responsible for development or maintenance of the portion of the application;
   before building the application, determine whether the responsible user is identified as a current user in stored information regarding current users;
   determine whether to build the application based at least on whether the responsible user is identified as a current user;
   in a first instance when the responsible user is identified as a current user, build the application in response to the build request;
   in a second instance when the responsible user is not identified as a current user:
   prevent the application from being built in response to the build request; and provide information via a graphical user interface indicating that the responsible user is not a current user.

9. The system of claim 8, the memory having further computer-executable instructions stored thereupon which, when executed by the processor, cause the system to:
   determine whether the stored information regarding current users indicates that the responsible user is currently a member of an organization that develops the application; and
   determine whether to build the application based on whether the stored information indicates that the responsible user is currently a member of the organization that develops the application.

10. The system of claim 9, wherein the stored information regarding current users comprises a hierarchical directory of active users that are currently associated with the organization.

11. The system of claim 8, the memory having further computer-executable instructions stored thereupon which, when executed by the processor, cause the system to:
   in the second instance when responsible user is not identified as a current user, repeatedly receive modified ownership identification information until all ownership identification information associated with the application identifies the current users as responsible for development or maintenance of the application, and subsequently allow the application to be built.

12. The system of claim 8, the memory having further computer-executable instructions stored thereupon which, when executed by the processor, cause the system to:
   determine whether to build the application based, at least in part, on a policy that defines a particular group of multiple individuals that are responsible for the application.

13. The system of claim 8, wherein the build request is a compilation request and the application is compiled in the first instance.

14. The system of claim 13 the memory having further computer-executable instructions stored thereupon which, when executed by the processor, cause the system to:
   detect user interaction with the application; and
   in response to detecting the user interaction with the application, output an identification of the responsible user via a user interface.

15. The system of claim 8, wherein the portion of the application comprises Hypertext Markup Language.

16. A computer storage media storing computer-readable instructions that, when executed, cause a computing device to:
   receive a compilation request to compile an application comprising multiple portions having different responsible developers, a particular portion of the application being associated with ownership identification information that identifies a particular responsible developer that is responsible for development or maintenance of the particular portion;
   before compiling the application in response to the compilation request, determine whether the particular responsible developer is identified in stored current user information as a current user;
   determine whether to compile the application based at least on whether the particular responsible developer is identified as a current user;
   in a first instance when the particular responsible developer is identified as a current user, compile the application; and
   in a second instance when the particular responsible developer is not identified as a current user:
      prevent the application from being compiled; and
      provide information via a graphical user interface indicating that the ownership identification information does not identify a current user as responsible for development or maintenance of the particular portion of the application.

17. The computer storage media of claim 16, storing further computer-readable instructions that, when executed, cause the computing device to:
   receive the ownership identification information.

18. The computer storage media of claim 16, wherein the stored current user information comprises a hierarchical directory of active users.

19. The computer storage media of claim 16, storing further computer-readable instructions that, when executed, cause the computing device to:
   in the second instance when the particular responsible developer is not identified as a current user, receive modified ownership identification information and compile the application provided the modified ownership identification information identifies another particular responsible developer that is identified as a current user.

20. The computer storage media of claim 16, wherein the stored current user information identifies current members of a particular organization.

* * * * *